Oct. 27, 1959 C. P. TODD 2,910,203
TRUCK LOADING AND UNLOADING DEVICE
Filed Jan. 17, 1958 2 Sheets-Sheet 1

INVENTOR.
CHARLES P. TODD.
BY
Lockwood, Galt, Woodard & Smith
ATTORNEYS.

Oct. 27, 1959   C. P. TODD   2,910,203
TRUCK LOADING AND UNLOADING DEVICE
Filed Jan. 17, 1958   2 Sheets-Sheet 2

INVENTOR.
CHARLES P. TODD,
BY
Lockwood, Galt, Woodard & Smith,
ATTORNEYS.

United States Patent Office 2,910,203
Patented Oct. 27, 1959

2,910,203

TRUCK LOADING AND UNLOADING DEVICE

Charles P. Todd, Bedford, Ind., assignor of one-half to Harold J. Bell, Indianapolis, Ind.

Application January 17, 1958, Serial No. 709,581

4 Claims. (Cl. 214—672)

This invention relates generally to loading and unloading devices, and in particular to a device of this type adapted for mounting on a tractor unit of a truck trailer.

In the transport of material by truck trailer to remote unloading sites where lift trucks or similar unloading equipment is not available, a considerable increment is added to the transport cost by the necessity for manual unloading. Particularly in the transport of building material to relatively remote home building sites, the manual unloading of relatively bulky and heavy materials, such as building stone, has in the past been time consuming and dangerous.

The solution for this problem would appear to be the provision of a lift truck on the tractor unit of the truck trailer, which after uncoupling of the tractor unit from the trailer can be moved into proper position at the loading and unloading gate of the trailer. In the past such attempts at solution of the problem have involved the incorporation of stationarily mounted lift trucks on the front end of the tractor, as shown in the Lehrman Patent No. 2,653,678, entitled "Loading and Unloading Elevator for Trucks." The front end mounting of the lift truck, as disclosed in the Lehrman patent has heretofore been necessary in order that the coupling means for attaching the trailer to the tractor be left unobstructed. The difficulties in this front end mounting arrangement, involving obstructed driving vision and danger to other vehicles on the road, are obvious.

It is, therefore, the principal object of the present invention to provide a loading and unloading device adapted for mounting on the rear area of a tractor unit which can be retracted into a position such that the trailer coupling area is unobstructed permitting conventional hitching and unhitching of the trailer.

A further object of the present invention is to provide a loading and unloading device of the type referred to above which, in retracted position, has no vision obstruction or otherwise dangerous projections extending from the tractor.

The full nature of the invention will be understood from the accompanying drawings and the following description and claims:

Figure 1:
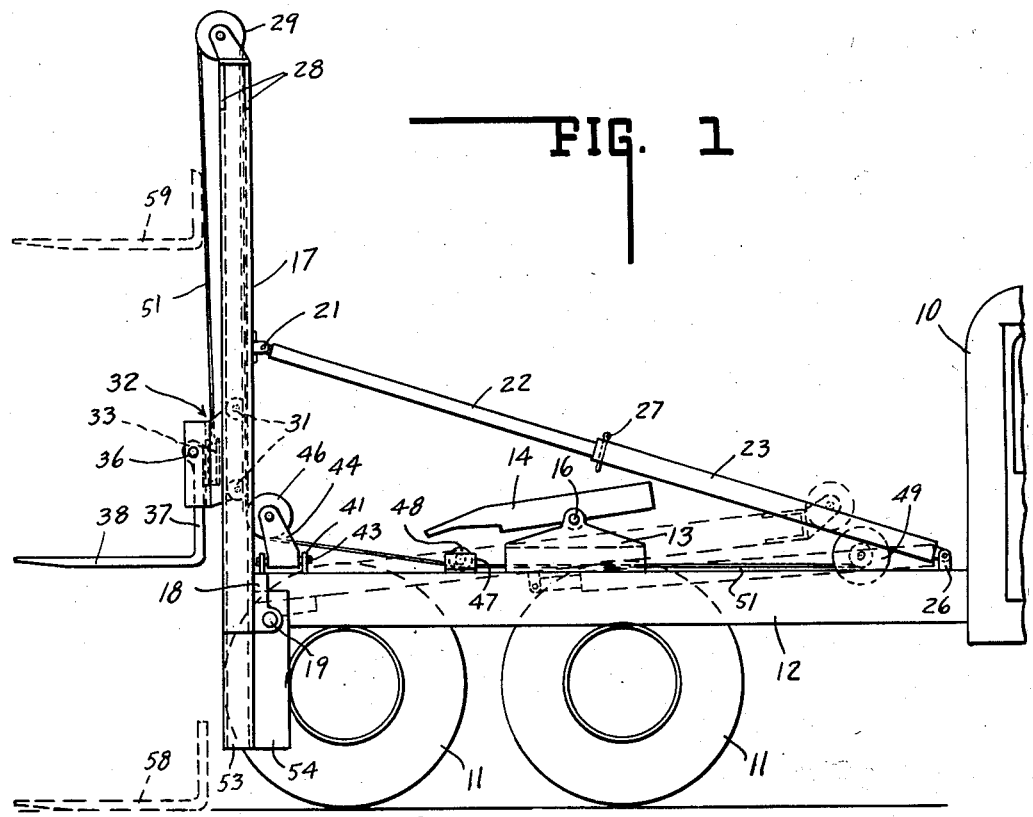
Fig. 1 is a side view of a loading and unloading device embodying the present invention shown in operative, upright position.
Figure 2:
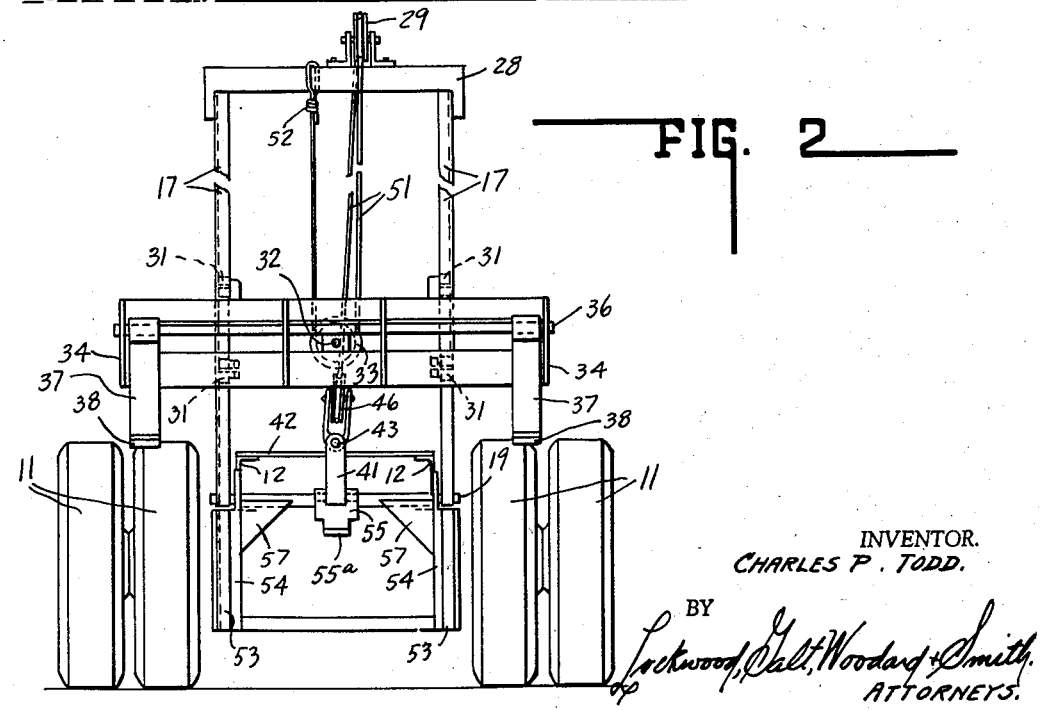
Fig. 2 is a rear view of the apparatus shown in Fig. 1.

Referring to Figs. 1 and 2, there is shown a truck cab 10 having the conventional double tandem wheels 11 mounted on a truck or tractor frame 12. The bed of the tractor conventionally mounts the coupling platform base 13 on which, in turn, a trailer coupling platform 14 is pivotally mounted at 16. It will be understood that the apparatus so far described is that conventionally present in the tractor unit of a truck trailer combination.

The loading and unloading device embodying the present invention includes spaced uprights 17 which are channel-shaped and at their lower ends are rigidly secured to rearwardly-extending brackets 18. The brackets are pivotally supported on hinge shaft 19 which is journaled in appropriate openings in the tractor frame.

Intermediate their ends each of the uprights has pivotally secured thereto at 22 an extensible telescoping brace member 23. The brace members are pivotally mounted on the truck frame by means of suitable brackets 26, and a removable pin 27 is used to lock the telescoping brace in extended position.

The uprights are provided with a cross bar 28 rigidly joining their ends, and has mounted thereon a sheave 29. The inwardly facing channels provided by the uprights serve as tracks for the rollers 31 which mount a lifting fork carriage 32. The rear margins 34 of the carriage mount a shaft 36 which, in turn, supports lifting forks 37 having rearwardly-extending tines 38. The upper ends of the forks are formed so as to encircle the shaft 36 and are freely movable thereon both angularly and longitudinally.

A generally U-shaped bracket 41 is supported on shaft 19 and rigidly secured to a cross member 42 of the truck frame. By means of pivot 43 the bracket pivotally mounts a sheave holder 44 which rotatably supports a sheave 46. Generally centrally within the tractor bed and intermediate its ends a bracket 47 rotatably mounts an idler sheave 48 and, adjacent the front end of the truck bed, there is conventionally mounted a hoisting winch 49. The hoisting winch is of conventional type, powered from a suitable power take-off of the tractor, and is controlled from the tractor cab in conventional fashion.

The hoisting cable 51 controllably played from the hoisting winch passes through the idler sheave 48 and consecutively through the aligned sheaves 46, 29 and 33 and is secured to the cross bar 28 as indicated at 52 in Fig. 2.

Mounted on the truck frame adjacent the lower ends of the uprights is a stowing dock for the lifting fork carriage, and includes channel-shaped members 53 which are aligned with and forms extensions of the uprights 17. The members 53 are supported by angle irons 54 rigidly secured to the tractor frame members 12. For added rigidity the members 53 have extending thereacross a bracing member 56 and are provided with triangular bracing plates 57 which are rigidly secured to the hinge shaft 19. As shown in Fig. 2, a member 55, having a rearwardly extending tongue 55a is pivotally supported on hinge shaft 19. The tongue portion of the member 55 is positionable so as to extend into locking relation with the lifting fork carriage to hold it in the stowing dock as the winch is operated to erect the uprights.

In operation, with the upright members locked in operative position, as shown in Fig. 1, by operation of the hoisting sheave the lifting fork carriage may be adjustably positioned along the uprights 17 and the channels 53, whereby the lifting forks are positioned between a maximum low position, indicated at 58 in Fig. 1, and a maximum high position, indicated at 59.

An important feature of the present invention permits the loading and unloading device to be moved to retracted position in which the trailer coupling platform is unobstructed and available for hitching of a trailer. Retracting of the loading and unloading device is accomplished by first lowering the lifting fork carriage into the stowing dock provided by the channels 53. The pin 27 may then be removed from the brace member 23 and the winch operated so as to permit the uprights to pivot about the hinge shaft 19 and assume a position along the longitudinal margins of the tractor bed as shown by broken lines in Fig. 1. When so positioned, it will be noted that both the bracing member and the uprights 17 are positioned below the plane of the trailer coupling member, leaving it unobstructed.

Figure 3:
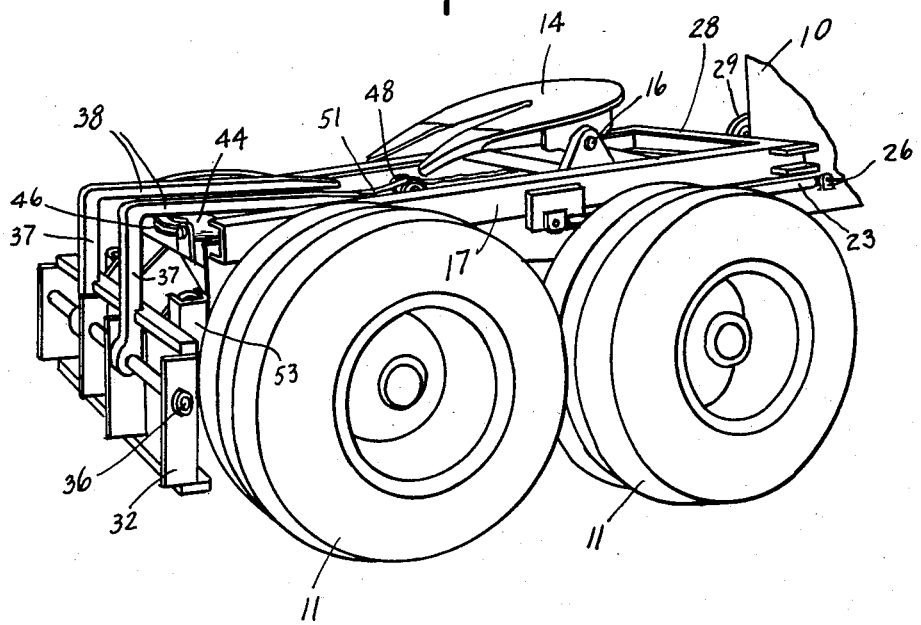
Fig. 3 is a fragmentary, perspective view showing the loading and unloading device in stowed position.

Additionally, as shown in Fig. 3, the sheave bracket 44 may be pivoted about its supporting pin 43 so as to dispose the sheave 46 horizontally along the tractor bed. The lifting forks may then be longitudinally moved along the shaft 36 to a central position thereon and rotated about the shaft so that their tines extend forwardly along the tractor bed, as shown in Fig. 3. As will be evident from Fig. 3, when thus retracted, the loading and lifting device is completely disposed below the trailer coupling platform, leaving it unobstructed for hitching a trailer thereto.

Thus, when a tractor-trailer operator arrives at an unloading site, he initially unhitches the trailer on the dolly conventionally provided on such trailers. The tractor is then brought to the rear of the trailer and properly positioned adjacent thereto. By operation of the winch, with the lift fork carriage locked in its stowing dock, the uprights are raised to operative position and the lifting forks are rotated into material handling position and disposed longitudinally along the shaft 19 as desired. Upon releasing the carriage from its stowing dock and further operating the hoisting winch, the operator may then unload the trailer. When unloading is completed the device may be retracted, as previously described and as shown in Fig. 3, and the trailer re-hitched to the coupling platform.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In combination with the tractor unit of a truck trailer having a trailer coupling platform generally centered on the tractor bed, a retractable loading and unloading device comprising transversely spaced uprights pivotally supported on the tractor frame and adapted to be disposed in retracted position along the longitudinal margins of the tractor bed and below the plane of the coupling platform, an extensible bracing element aligned with each of said uprights and pivotally joined thereto intermediate the upright ends, a carriage movably supported on said uprights, a power operated hoisting winch for raising said uprights to operative position and positioning said carriage along said uprights, a stowing dock for said carriage mounted on said truck frame adjacent the upright support pivots and below the plane of the coupling platform, said stowing dock comprising stationary extensions of said uprights adapted to receive said carriage when said uprights are in retracted position, and a lift fork pivotally supported on said carriage and movable into a stowed position below the plane of the coupling platform when said carriage is in said stowing dock, whereby with said uprights in retracted position and said lift fork in stowed position the trailer coupling platform is unobstructed for trailer attachment.

2. In combination with the tractor unit of a truck trailer having a trailer coupling platform generally centered on the tractor bed, a retractable loading and unloading device comprising transversely spaced uprights pivotally supported on the tractor frame and adapted to be disposed in retracted position along the longitudinal margins of the tractor bed and below the plane of the coupling platform, an extensible bracing element aligned with each of said uprights and pivotally joined thereto intermediate the upright ends, a carriage movably supported on said uprights, a power operated hoisting winch for raising said uprights to operative position and positioning said carriage along said uprights, a stowing dock for said carriage mounted on said truck frame adjacent the upright support pivots below the plane of the coupling platform, said stowing dock comprising stationary extensions of said uprights adapted to receive said carriage when said uprights are in retracted position, and a lift fork pivotally supported on said carriage, whereby with said uprights in retracted position the trailer coupling platform is unobstructed for trailer attachment.

3. In combination with the tractor unit of a truck trailer having a trailer coupling platform generally centered on the tractor bed, a retractable loading and unloading device comprising transversely spaced uprights pivotally supported on the tractor frame and adapted to be selectively raised to operative position and disposed in retracted position along the longitudinal margins of the tractor bed and below the plane of the coupling platform, a bracing element aligned with each of said uprights and pivotally joined thereto intermediate the upright ends, a carriage movably supported on said uprights, winch means for positioning said carriage along said uprights, a stowing dock for said carriage mounted on said truck frame adjacent the upright support pivots and below the plane of the coupling platform, said stowing dock comprising stationary extensions of said uprights adapted to receive said carriage when said uprights are in retracted position, and lift forks pivotally supported on said carriage and movable into a stowed position below the plane of the coupling platform when said carriage is in said stowing dock, whereby with said uprights in retracted position and said lift forks in stowed position the trailer coupling platform is unobstructed for trailer attachment.

4. The combination with the tractor unit of a truck trailer having a trailer coupling platform generally centered on the tractor bed, a retractable loading and unloading device comprising transversely spaced uprights pivotally supported on the tractor frame and adapted to be selectively raised to operative position and disposed in retracted position along the longitudinal margins of the tractor bed and below the plane of the coupling platform, a bracing element aligned with each of said uprights and pivotally joined thereto intermediate the upright ends, a carriage movably supported on said uprights, winch means for positioning said carriage along said uprights, a stowing dock for said carriage mounted on said truck frame adjacent the upright support pivots and below the plane of the coupling platform, said stowing dock comprising stationary extensions of said uprights adapted to receive said carriage when said uprights are in retracted position, whereby with said uprights in retracted position and said carriage accommodated in said stowing dock the trailer coupling platform is unobstructed for trailer attachment.

References Cited in the file of this patent

UNITED STATES PATENTS

| | | |
|---|---|---|
| 1,919,608 | Troell | July 25, 1933 |
| 2,190,258 | Colorigh | Feb. 13, 1940 |
| 2,437,806 | Dempster | Mar. 16, 1948 |
| 2,502,357 | Wagner | Mar. 28, 1950 |
| 2,503,181 | Wagner | Apr. 4, 1950 |
| 2,639,829 | Dempster et al. | May 26, 1953 |
| 2,689,053 | Olson | Sept. 14, 1954 |
| 2,707,063 | Gran | Apr. 26, 1955 |